(12) United States Patent
Tayloe et al.

(10) Patent No.: US 7,076,265 B2
(45) Date of Patent: Jul. 11, 2006

(54) POWER REDUCTION METHOD FOR A MOBILE COMMUNICATION SYSTEM

(75) Inventors: Daniel R. Tayloe, Phoenix, AZ (US); Chih-Ming J. Chiang, Chandler, AZ (US); Mark T. Pflum, Chandler, AZ (US); Zaigham A. Kazmi, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 455 days.

(21) Appl. No.: 10/672,039

(22) Filed: Sep. 26, 2003

(65) Prior Publication Data

US 2005/0070322 A1 Mar. 31, 2005

(51) Int. Cl.
*H04B 7/00* (2006.01)
*H04Q 7/20* (2006.01)

(52) U.S. Cl. .................. 455/522; 455/13.4; 455/60; 455/69; 455/127; 455/269; 455/421; 455/422.1; 455/432.1; 455/435.1; 455/442; 455/574

(58) Field of Classification Search ............... 455/522, 455/13.4, 436, 442, 60, 69, 127.1, 127.2, 455/127.3, 127.4, 127.5, 269, 421, 437, 438, 455/439, 574, 432.1–432.2, 432.3, 435.1–435.2, 455/435.3
See application file for complete search history.

(56) References Cited

U.S. PATENT DOCUMENTS

| | | | | |
|---|---|---|---|---|
| 6,259,927 | B1 * | 7/2001 | Butovitsch et al. | 455/522 |
| 6,442,393 | B1 * | 8/2002 | Hogan | 455/456.5 |
| 6,967,987 | B1 * | 11/2005 | Higuchi et al. | 375/130 |
| 6,996,069 | B1 * | 2/2006 | Willenegger | 370/252 |
| 2002/0009061 | A1 * | 1/2002 | Willenegger | 370/328 |
| 2004/0174926 | A1 * | 9/2004 | Shinde | 375/141 |

* cited by examiner

*Primary Examiner*—Nay Maung
*Assistant Examiner*—Shaima Q. Aminzay
(74) *Attorney, Agent, or Firm*—Frank J. Bogacz; Kevin D. Wills (57) ABSTRACT

A mobile unit 40 which is in a soft handoff condition 50 with a base station (32) has the power transmitted by the base station (32) on the mobile link (52) controlled. The base station (32) determines (70) when a frame erasure count reaches a particular level N. The base station then places this link in a clamped state (72) at minimum power. When the base station determines that M consecutive good frames have been received (92), the base station restores the link (52) to a normal state (94). A recovery arrangement (100, 110 and 120) prevents clamping by all base stations (32–34) and loss of the link.

8 Claims, 5 Drawing Sheets

POWER REDUCTION METHOD FOR A MOBILE COMMUNICATION SYSTEM

BACKGROUND OF THE INVENTION

The present invention pertains to mobile telecommunications and more particularly to forward link power reduction methodology in soft handoff environments.

Mobile telecommunication systems include wireless links between mobile stations, which may be mobile telephones, pagers, computers, etc., and a base station of the mobile telecommunication system. Since these links are wireless, the links are susceptible to noise and interference with other signals. The signals received at the mobile station or at the base station (BS) may fade due to errors in the RF links or legs coupling the base station to the mobile unit. That is, the data signals received by the mobile station may become much more attenuated than the surrounding noise and other interference.

The quality of wireless telecommunication is often measured by the ability of the mobile unit to receive accurate and clear data from the base station. As errors are detected by the mobile unit, the base station may increase the transmission power on the leg which couples the base station and the mobile unit. When greater power is used on a RF link or leg, the power increase causes interference for other links or legs coupling the base station to other mobile units and with other links from other base stations coupling to the mobile unit in a soft hand off configuration.

When one of the legs between the mobile unit and a base station becomes weak, for example, a hill might interfere with line-of-sight transmission, typical base station equipment tends to rapidly drive up the weak leg or link to full power. This creates several problems. The first being that since the base station has a finite amount of power using excessive power in any one link will necessarily limit the power available for links with other mobile units. Second, excessive use of power by base station creates more RF interference for other mobile units in the area.

One solution to this problem has been to eliminate weak legs coupling base stations to the mobile unit. However, completely eliminating weak legs increases RF losses, since current weak legs may be future strong legs that maintain a call when the mobile unit drives over a hill, for example. That is the previously strong base station leg becomes the weak one and the previously weak base station leg becomes the good one and thereby saves and maintains the call.

Accordingly, it would be highly desirable to have a power reduction method which limits the effects of weak RF transmission links (or legs) with mobile units.

PREFERRED EMBODIMENT OF THE INVENTION

In a code division multiple access (CDMA) mobile telecommunication system, power control bits are continuously transmitted by both mobile units and base stations to the other requesting that the entity at the other end of the mobile link power up or power down. Typically each mobile unit continuously sends power control bits (PCBs) to the base station requesting that the base station transmit its information with greater power since the signal being received is fading.

A frame erasure rate (FER) measures the number of data frames transmitted by the base station to the mobile unit which are received in error on the forward link. A typical scenario for high frame erasure rates consists of a moving mobile unit which loses a good line-of-site coupling with the base station. The scenario is that the mobile unit transmits consecutive requests for powering up by the base station of its forward link transmissions to the mobile unit. Such powering up on the forward link presents more interference to other mobile units in line-of-sight communication with the base station or another base station; and this causes the base station to use excessive power for one particular mobile unit.

Further, when several base stations are in a soft handoff configuration with the mobile unit, several base stations may be wasting excessive power on one particular mobile unit. This scenario may happen for many mobile units in which case the base station's power becomes used to maintain links which have high FERs.

Figure 1:
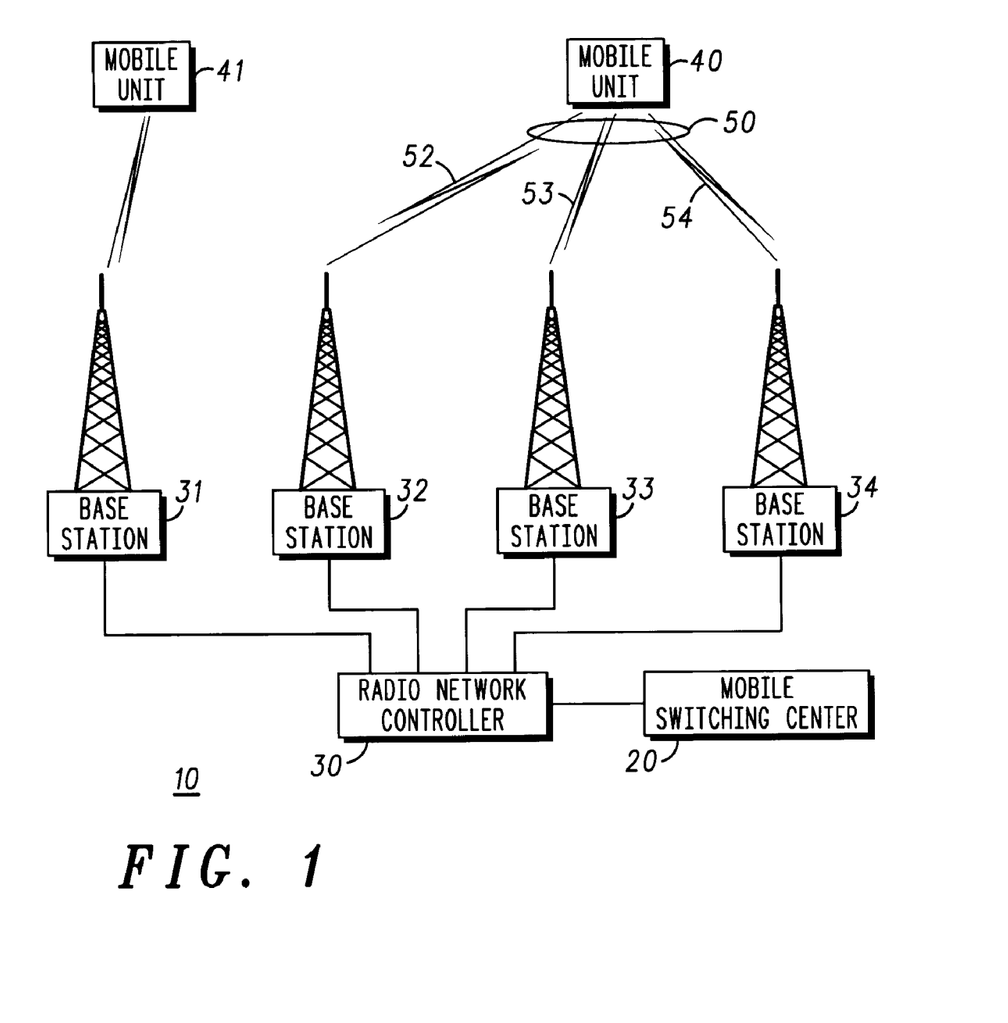
FIG. 1 is a block diagram of a mobile telecommunication system in accordance with the present invention.

Referring to FIG. 1 a block diagram of a mobile telecommunication system 10 is shown. Mobile switching center 20 which interconnects to other switching systems is coupled to radio network controller 30. Radio network controller 30 is coupled to several base stations 31, 32, 33 and 34. Base station 31 is coupled to mobile unit 41. Base stations 32, 33 and 34 are coupled to mobile station 40 in a soft handoff configuration 50 via forward links 52, 53 and 54. If the movement of mobile unit 40 is such that forward links 52 and 53 have poor line-of-sight coupling, for example if there is a hill between mobile unit 40 and base stations 32 and 33, mobile unit 40 will request that base stations 31, 32, and 33 successively power up their transmissions to mobile unit 40.

The weak signal from mobile 40 to base stations 52 and 53 can cause those base stations to get errored power control commands from the mobile which in turn can cause those base stations to transmit at an excessively high power. As a result the situation mentioned above will ensue, that is, base stations 32 and 33 will be wasting power on transmissions to mobile unit 40. These transmissions will have a low probability of success since the frame erasure rate has climbed in both cases.

In such cases, if base stations 32 and 33 could determine that this is a weak link that will contribute little to the call, they could limit their transmit power to this mobile unit and thus save power, reduce system interference and increase system capacity. So in order for the base stations 32 and 33 to conserve power, knowledge of the FER associated with a particular mobile unit such as mobile unit 40 is essential.

Figure 2:
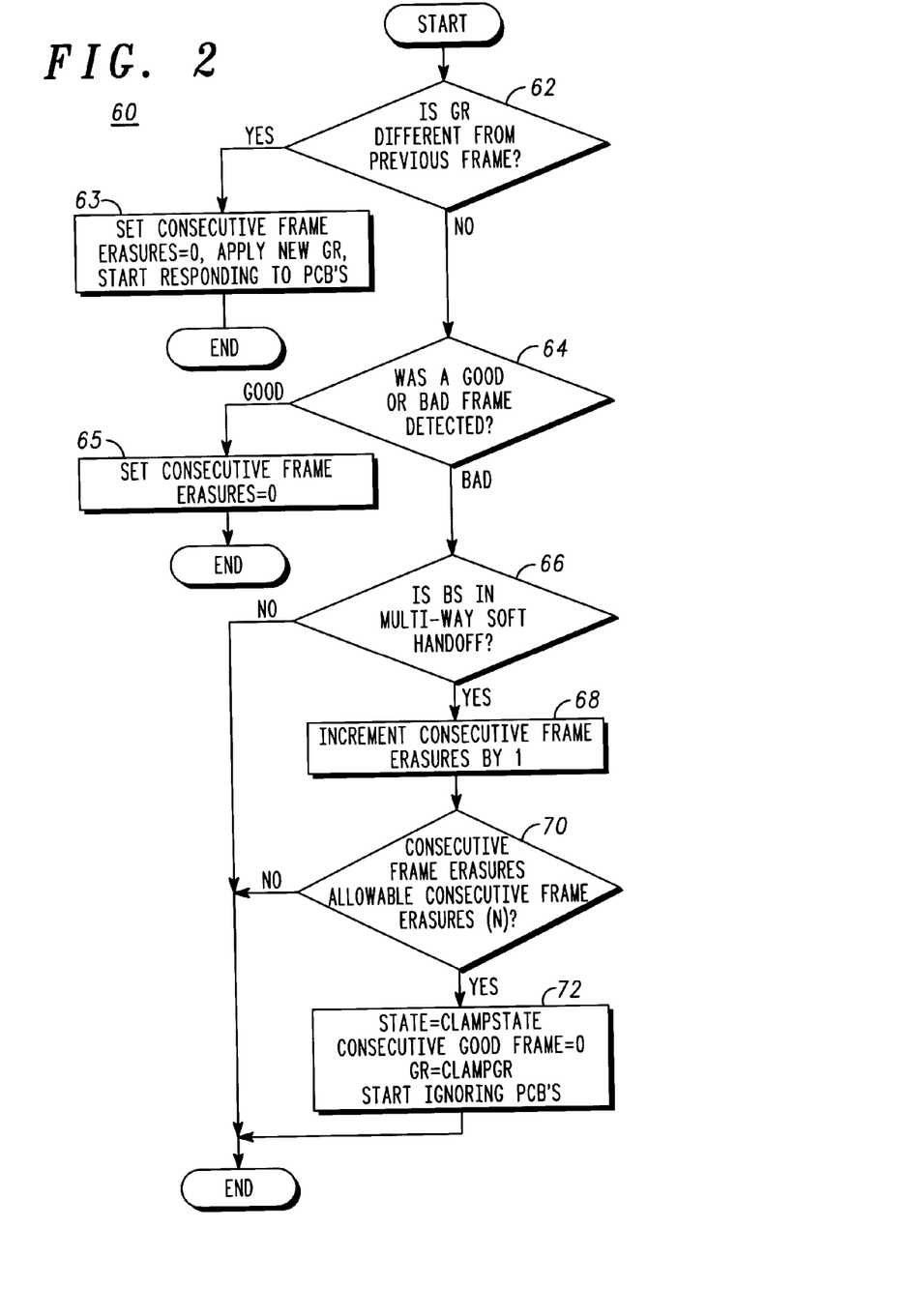
FIG. 2 is a flow chart of an unclamped power reduction method in accordance with the present invention.

Turning now to FIG. 2 a flow chart of the power control method 60 for normal operation of the base station is shown. Generally, the base station and more specifically the base station transceivers (BTS) 31–34 use a frame erasure rate (FER) to measure each link or leg using the FER as a quality metric.

There are many mechanisms that can be used as a measure of the goodness of an RF link, such as the received RF signal to interference ratio at the receiver, but FER is the preferred embodiment used here. In addition, the FER can be measured using other means such as N good frames out of M frames, but in this preferred embodiment, the base station will examine the frame erasure rate consistently and will detect when "N in a row" bad frames exist. When "N in a row" bad frames are detected, the power used by the base station on that particular leg or link will then be clamped to a relatively low power. And once the power is clamped to the relatively low power level, the base station will look for "M in a row" good frames in order to unclamp the power used by the base station on that leg. Once again, other FER mechanisms can be used to determine when to stop limiting the base station forward power such as X good frames out of Y frames. It has been determined that in a preferred embodiment, N should be three consecutive bad frames and M should be four consecutive good frames. The good and bad determinations are made using the frame erasure rate detected by the base station.

In FIG. 2 the base station normal state processing is started and block 62 is entered. FIG. 2 corresponds to functionality that takes place only in the "NORMAL" state. Every call starts out in this "NORMAL" state. The gain ratio (GR) is the base station transmit power to an individual user expressed as a fraction of the CDMA pilot power. The CDMA pilot power is a fixed power system overhead channel. First the base station 32, for example, determines whether the gain ratio of the present frame sent down by the RNC to the BS is different from the gain ratio of the previous frame sent down by the RNC to the BS, block 62. If so this gain ratio difference indicates that the base station forward power is being over-ridden by the RNC and block 62 transfers control to block 63. This override function by the RNC will be discussed later as a part of a recovery mechanism to handle the case where all BS legs independently decide to clamp forward power at the same time. In the override case, block 63 sets a parameter for consecutive frame erasures equal to zero. Next the new gain ratio is applied to the data transmission. After the new gain ratio is set, the base station begins responding to the power control bits (PCBs) transmitted by the mobile unit 40. Then the process is ended.

If the gain ratio of the present frame sent down by the RNC to the BTS is the same as the gain ratio of the previous frame sent down by the RNC to the BS, then no override is in place, so block 62 transfers control to block 64 via the no path. Block 64 determines whether a good or bad frame was detected. If a good frame is detected block 64 transfers control to block 65 via the good path. Block 65 sets the consecutive frame erasure to zero and ends the process. A good frame was detected so no counting for frame erasures is necessary.

If a bad frame was detected block 64 transfers control to block 66 via the bad path.

Next block 66 determines by the base station whether the base station is in a multi-way soft handoff as demonstrated by condition 50 in FIG. 1. If the base station or more specifically the base station transceiver is not in a multi-way soft handoff block 66 ends the process. If the call is not in soft handoff (i.e., more than one base station call path to the mobile), then it is not desirable to gain limit the only leg in the call. Thus process 60 is ended.

However, if the base station determines that it is in a multi-way soft handoff block 66 transfers control to block 68 via the yes path. Block 68 increments the consecutive frame erasures by one. That is a bad frame was detected and the particular base station is in a multi-way soft handoff in which power needs to be controlled by more than one base stations. Block 66 then transfers control to block 68 via the yes path. The base station then increments the consecutive frame erasure by one, since a bad frame was received, block 68.

Next the base station checks the consecutive frame erasures as being equal to the allowable consecutive frame erasures N. If they are not equal block 70 ends the process. If the base station detects N in a row frame erasures, block 70 transfers control to block 72 via the yes path.

Block 72 sets the state of the particular forward link or leg equal to the "clamped state". While in this state, every frame the GR for the transmit power to the mobile will be reset to a specified low power level. Next, the base station sets the consecutive good frame parameter (M) equal to zero. As mentioned the gain ratio is considered to be clamped so that any further power control bits requesting an increase in power by the mobile unit will effectively be ignored. The process is then ended.

There are several ways to clamp the forward transmit power to the user. One mechanism would be to set the GR to the minimum power, then set the power control command step up and step down size to zero. However, the preferred embodiment keeps the step up and step down size the same and simply resets the GR to the minimum power at the beginning of each frame while the "clamped state" is active.

Figure 3:
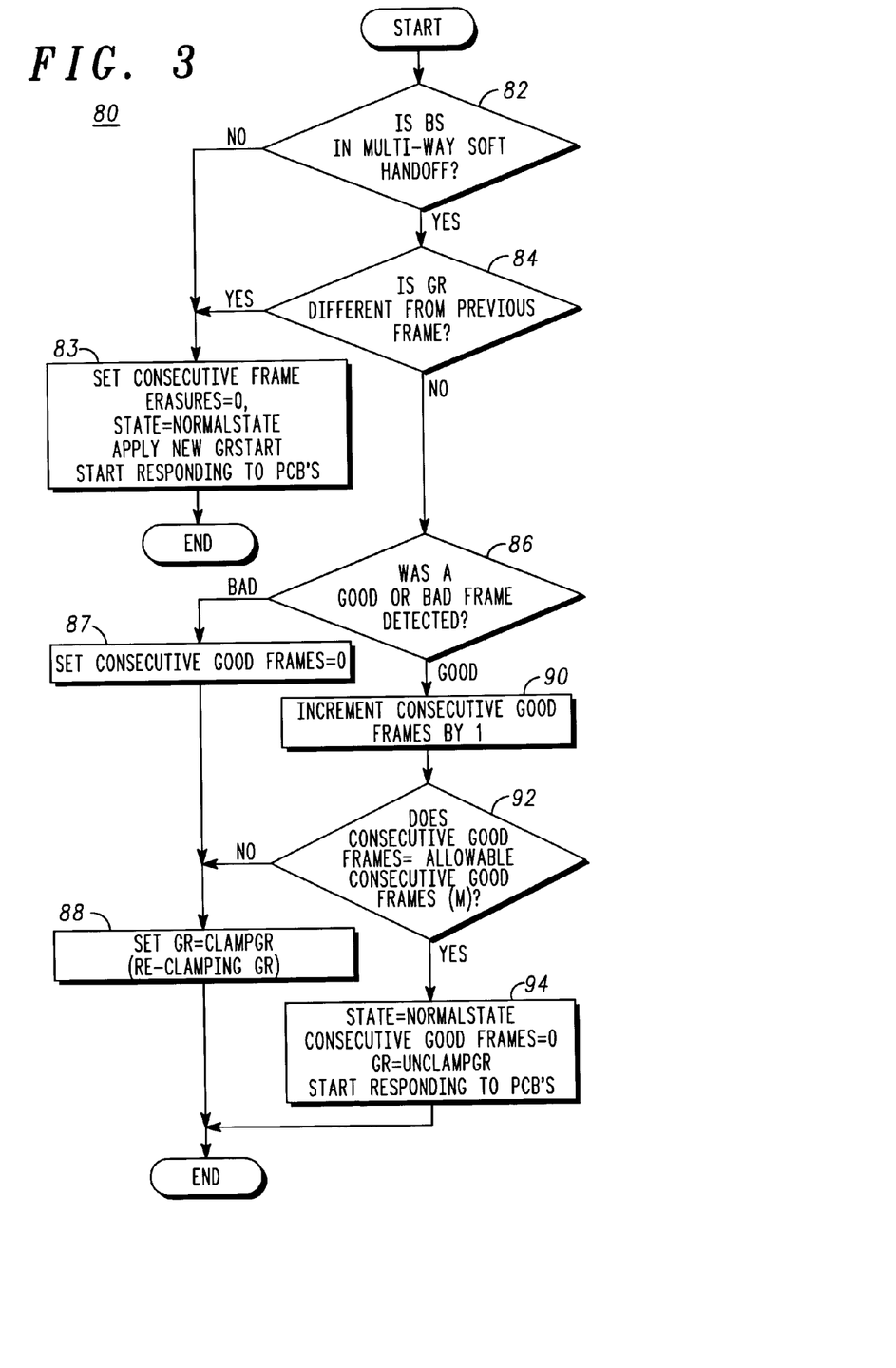
FIG. 3 is a flow chart of a clamped power reduction method in accordance with the present invention.

Referring to FIG. 3 a flow chart of the base station clamped state processing in the "clamped state" for a particular forward link or leg is shown. The processing at the base station needs to determine whither the leg is in the "normal" state and use process 60 of FIG. 2 or in the "clamped state" and use process 80 of FIG. 3. Assuming that the base station leg is in the "clamped state", the process is started and block 82 is entered. In block 82 the base station or base station transceiver determines whether it is in a multi-way soft handoff. If the handoff state has changed, and this is now the only handoff leg for the mobile, this leg should no longer be clamped, so the state is changed to the normal state and the clamping is ended. If the BS is no longer in a multi-way soft handoff block 82 transfers control to block 83 via the no path. In block 83 the base station sets the consecutive frame erasure equal to zero. Next it sets the state equal to a normal state since no other links to other base stations are being used in the call and minimizing power in this situation may result in a dropped call. This is to be avoided when only one link exists. Lastly base station applies the new gain ratio and then starts responding to power control bits from the mobile unit 40. The process is then ended.

If the base station determines that it is still in a multi-way soft handoff block 82 transfers control to block 84 via the yes path. Block 84 determines whether the gain ratio sent down by the RNC to the base station for this frame is different, from the gain ratio sent down by the RNC to the base station on the previous frame. If the gain ratio is different then the "clamp" state processing is overridden by the RNC and the state is returned to the "normal" processing state. As mentioned above, this override function by the RNC will be discussed later as a part of a recovery mechanism to handle the case where all base station legs independently decide to clamp forward power to a low power at the same time. In this case, block 84 transfers control to block 83. Block 83 again sets the consecutive frame erasure rate equal to zero and puts the base station link in a normal state.

The base station then applies the new gain ratio and starts responding to the power control bits of the mobile unit. Then the process is ended.

If the gain ratio sent down by the RNC to the base station of this frame is the same as the gain ratio sent down by the RNC to the base station on the previous frame, then the "clamp" state is not overridden by the RNC, so block 84 transfers control to block 86 via the no path. In block 86 the base station determines whether a good or a bad frame has been detected. If a bad frame is detected block 86 transfers control to block 87 via the bad path. In block 87 the base station sets the consecutive good frame (M) equal to zero. Lastly block 88 sets the gain ratio equal to clamping, since the particular leg or link was already clamped and another consecutive bad frame was received. The process is then ended.

If the base station detected a good frame block 86 transfers control to block 90 via the good path. In block 90 the base station increments the consecutive good frame count by one. M is the number of consecutively received good frames necessary and required for unclamping the power of the particular leg. For each consecutive good frame, the consecutive good frames counter is incremented. Next, base station determines whether the number of consecutive good frames M is equal to the allowable consecutive good frames M. As is the case with the allowable consecutive frame erasures, the number of allowable consecutive good frames is determined in a preferred embodiment to be equal to four. If the base station determines in block 92 that the consecutive good frames count is less than the allowable consecutive good frames M, block 92 transfers control to block 88 via the no path. Block 88 resets the gain ratio for an indication of clamping the particular leg or link and ends the process.

If the BS detected M consecutive good frames in a row which is the number of allowable consecutive good frames, four in a preferred embodiment, block 92 transfers control to block 94 via the yes path.

In block 94 the base station sets the state back to a normal processing or unclamped state since M in a row consecutive good frames have been received on this particular link or leg. Next the consecutive frame erasures are reset to zero. Lastly the gain ratio is unclamped by further responding by the base station to the power control bits of the mobile unit 40. The process is then ended.

The independent clamping of each leg by each base station can cause a problem to occur. Referring again to FIG. 1, if each of the base stations 32, 33 and 34 that are in a soft handoff condition 50 with mobile station 40 determine that an increased frame erasure rate condition exists, they will each clamp their respective forward links or legs 52, 53 and 54 thereby forcing each link to minimal power which may eventually result in the particular call of mobile unit 40 to be dropped. This is not an acceptable result.

As a consequence, within the radio network controller a transcoder function (not shown) associated with the RNC is modified to override the clamping of each of the legs or links 52, 53 and 54 as shown in soft handoff condition 50 if it sees all voice frames are missing from all base station legs for a period of time.

This detection functionality could be implemented a number of different way, but the preferred embodiment was to look for N in a row cases of bad frames from all legs (base stations) of the call.

Figure 4:
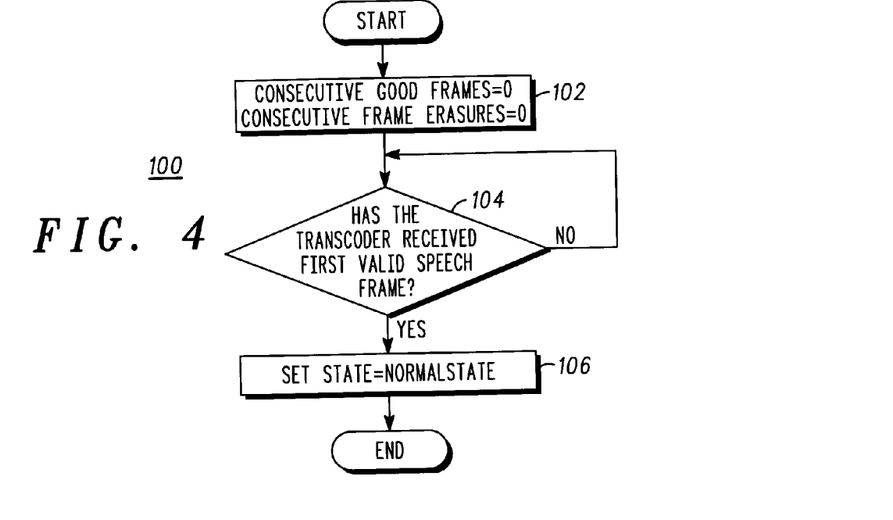
FIG. 4 is a flow chart of an initial state processing of a transcoder of a radio network controller in accordance with the present invention.

First in the RNC "initial" state processing of RNC 30, process 100 is shown in flow chart form in FIG. 4. This is done only once during the start of a call. The process is started and block 102 is entered. The radio network controller (RNC) 30 first sets the consecutive good frames to zero; and sets the consecutive frame erasures to zero, block 102. Next in block 104 the RNC determines whether the first valid speech frame has been received. If the first valid data frame has not been received, block 104 keeps checking via the no path. If the first valid speech frame has been detected block 104 transfers control to block 106 via the yes path. Block 106 sets the "normal" state processing for the RNC. Then the process is ended.

Figure 5:
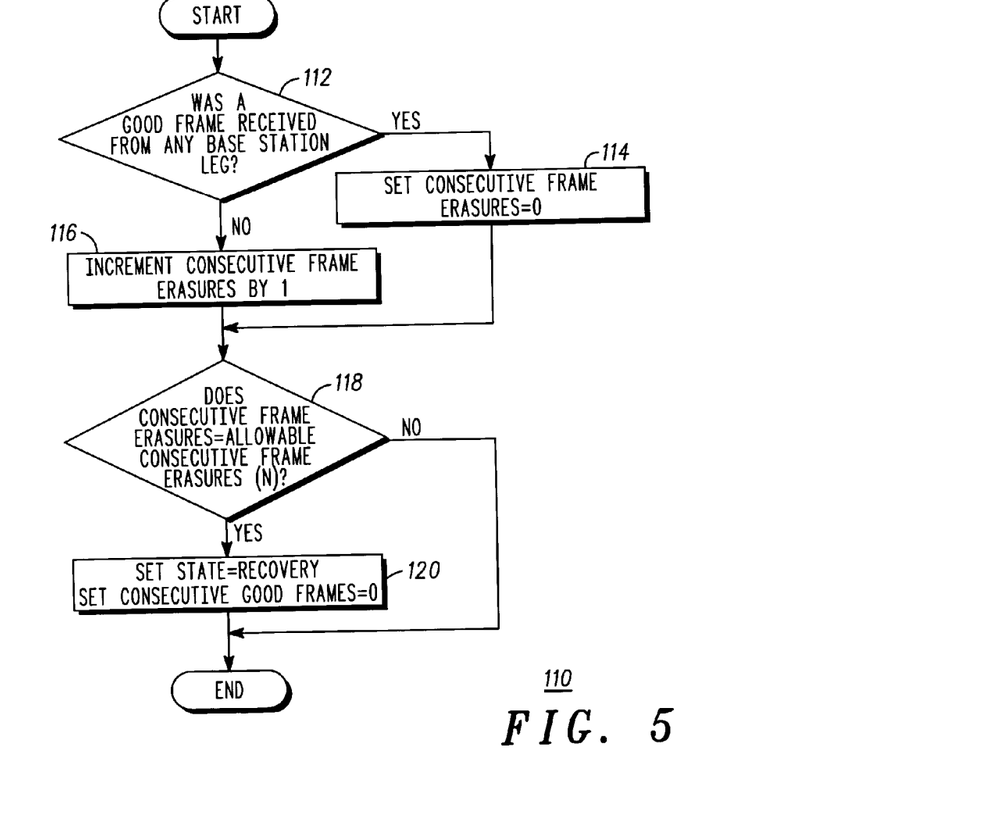
FIG. 5 is a flow chart of transcoder processing of a radio network controller for a power reduction method in accordance with the present invention.

Referring next to FIG. 5 the RNC "normal" state processing of a rescue method 110 is shown. The "normal" state processing 110 is started and block 112 is entered. The RNC determines whether a good frame was received from any of the base station legs, block 112. If a good frame was received block 112 transfers control to block 114 via the yes path. In block 114 the RNC sets the consecutive erasures equal to zero and then transfers control to block 118.

If no good frame was received from any of the base station legs, block 112 transfers control to block 116 via the no path. In block 116, the RNC increments the number or count of the consecutive frame erasures by one, since no good frame was received from any base station legs. Then block 116 transfers control to block 118.

In block 118 the RNC determines whether the counted number of consecutive frame erasures is equal to the allowable number of consecutive frame erasures N. If they are not equal, block 118 simply ends the process via the no path. If the RNC determined that the number of consecutive frame erasures equals the number of allowable consecutive frame erasures N, block 118 transfers control to block 120 via the yes path. Block 120 sets the state as a "recovery" state. Lastly the RNC sets the consecutive good frames equal to zero and ends the process.

Having detected that no good frames are detected from any base station leg for a period of time, the "recovery" state will be entered when the RNC sends down high power GR changes that override those used by the associated base station legs. As seen in the descriptions in FIG. 2 and 3, this will force the base station legs to a higher power so that the call can be recovered. The RNC will continue to force a high GR to all legs of the call until either good frames start arriving again or until the call is considered lost.

In the preferred embodiment, a call recovery starts with the base station transmit gain forced to a lower, nominal value (such as 20% of pilot), then ramped up over several frames to maximum power (such as 50% of pilot power). The hope is that the call can be recovered before maximum power is reached, thus saving power. However, this power ramping is not strictly necessary to recover the call and alternative embodiments might simply set the power to some high power GR such as max power and keep it there until the call recovers or the call is declared dead.

For recovery purposes the preferred embodiment of the allowable consecutive frame erasures N is six. However, any number two or greater may be used. For exiting from the recovery state the required number of consecutive good frames M, in the preferred embodiment, is three. Any number of consecutive good frames greater than two consecutive good frames may be used as the number of allowable consecutive good frames M.

Figure 6:
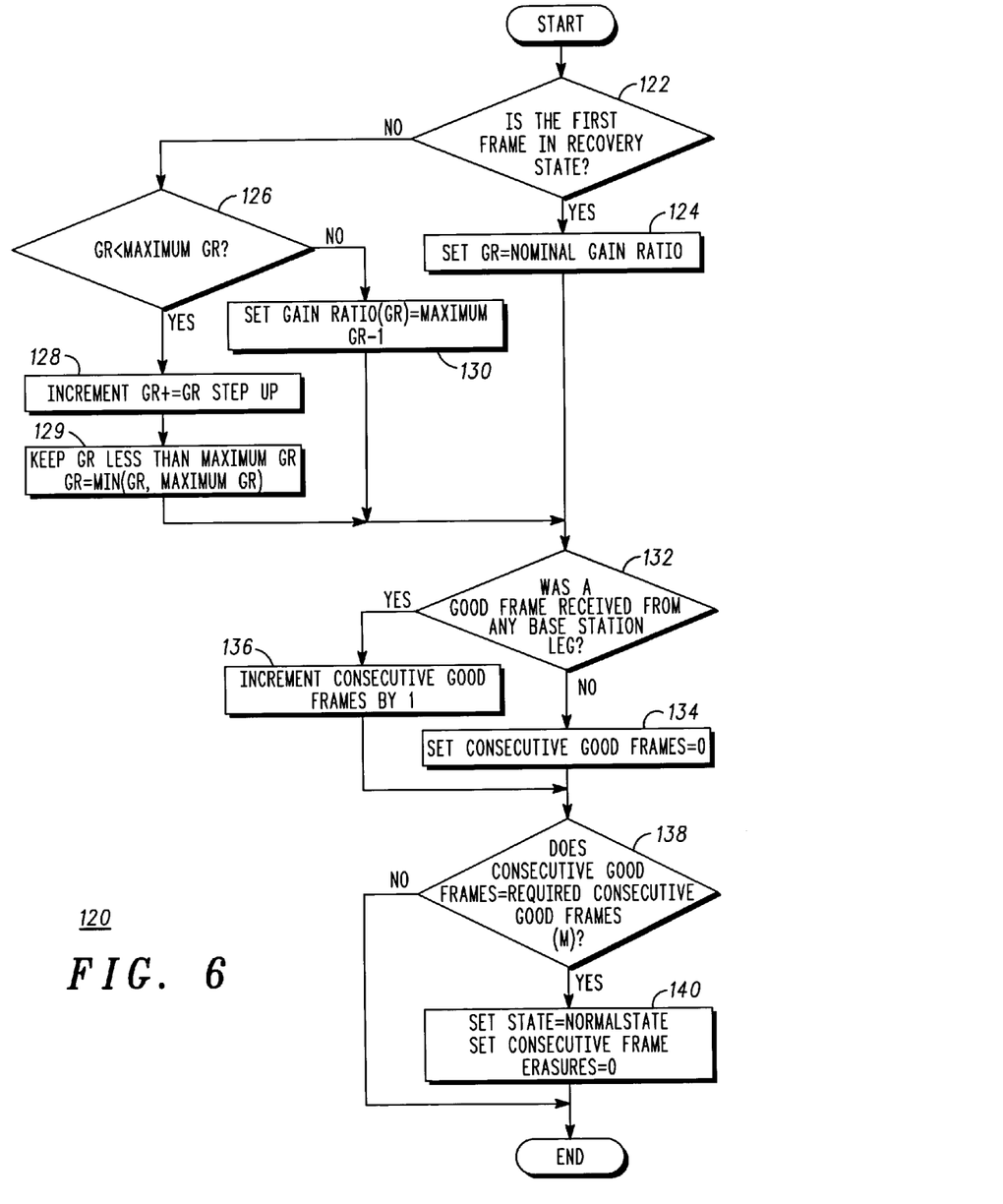
FIG. 6 is a flow chart of a recovery process for a power reduction method in accordance with the present invention.

Referring to FIG. 6 a flow chart of the rescue and "recovery" state processing for the RNC to override simultaneous multiple base station clamping 120 is shown. The process of recovery 120 is started and block 122 is entered. Block 122 determines whether this particular frame is the first data frame received while in the recovery state. If it is the first data frame, block 122 transfers control to block 124 via the yes path. In block 124 the RNC sets the gain ratio (GR) for this link or leg to a nominal gain ratio. A nominal gain ratio is selected as a parameter, typically intermediate between the minimum required for two-way communication and the maximum allowable by the base station which in the preferred embodiment is typically 20% of the pilot power. Block 124 then transfers control to block 132.

If the present frame is not the first frame in the recovery state, block 122 transfers control to block 126 via the no path. Block 126 determines whether the gain ratio is less than a maximum gain ratio (maxGR). The maximum gain ratio that can be used for a user is maxGR, which is typically set to 50% of pilot power. This maximum gain ratio can change as a function of the number of base station legs in the call or other call conditions. If the gain ratio is not less than maxGR, the gain ratio is maxGR; and block 130 sets the gain ratio equal to maxGR-delta, where delta in the preferred embodiment equal to 1. The idea here is to toggle the gain ratio between the maximum gain ratio and some value slightly less than maximum gain so the base stations legs involved can tell that the GR changed. Block 130 then transfers control to block 132.

If the RNC determines that the gain ratio is less than maxGR, block 126 transfers control to block 130 via the yes path. Block 130 increments the gain ratio by a predetermined gain ratio step up size, usually one or more power increments. The gain ratio step up size may be any positive integer less than maxGR. Next, block 129 insures that the gain ratio is less than maxGR. Block 129 then transfers control to block 132. Block 130 then transfers control to block 132.

In block 132 the RNC determines whether a good frame was received from at least one base station leg. If a good frame was received, block 132 transfers control to block 136 via the good path. Block 136 increments the count or number of counted consecutive good frames received by one. Block 136 then transfers control to block 138. If no good frame was received from any base station leg, block 132 transfers control to block 134 via the bad path. Block 134 sets the count of consecutive good frames to zero. Then block 134 transfers to block 138.

In block 138 the RNC determines whether the counted number of consecutive good frames is equal to the required number of consecutive good frames M. In a preferred embodiment, the required number of consecutive good frames to exit the recovery state has been selected to be three. Any number of consecutive good frames two or greater may be used. If the number of consecutive good frames is not equal to the required number M, block 138 simply ends the process via the no path. If the number of consecutive good frames does equal the required number M, block 138 transfers control to block 140 via the yes path. In block 40 the RNC sets the state back to the "normal" state and out of the recovery state. In addition block 140 sets the number of consecutive frame erasures equal to zero and ends the process 120.

When the RNC exits the "recovery" state, it will no longer be overriding the GRs set by the individual base station legs, so the base stations are once again given the autonomy to gain limit bad legs.

Table 1 below shows the preferred embodiment of the number of consecutive frame erasures and good frames for the base station to perform clamping and to perform unclamping. Further Table 1 shows the number of consecutive frame erasures required by the RNC (transcoder function) necessary to start or end the recovery or rescue process for power control.

TABLE 1

|  | Number Consecutive FER | Number Consecutive Good Frames |
|---|---|---|
| Base Station | 3 for clamping | 4 for unclamping |
| RNC | 6 for recovery | 3 for normal |

As is demonstrated by the above methodology, the present invention provides for limiting power used on forward links. The forward links or legs may be in a soft handoff condition where the legs are weak due to physical line-of-sight circumstances. This method requires N in a row bad frames before a link is clamped; and M in a row good frames before the leg is unclamped. In addition a rescue method is provided for preventing each of the legs in a soft handoff from clamping at the same time and thereby risking losing the call. Again it takes N in a row bad frames from all base station legs to trigger the recovery and M in a row good frames from any base station leg to trigger removal of the recovery and return to normal processing. The parameters N and M may be different for the clamping and unclamping process as compared to the recovery and rescue process.

The total power savings with this methodology is approximately 2 db. These methods decrease the RF {radio frequency) loss by up to 45% while saving power for each base station and increasing system call capacity.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a mobile communication system, a power reduction method for coupling a base station to a mobile unit, the power reduction method comprising the steps of:
   detecting consecutive frame erasures (FERs)on a link coupling the base station to the mobile unit, wherein if a consecutive frame erasure is detected, there is further included a step of incrementing a consecutive frame erasure counter;
   determining whether the base station is in a soft handoff condition with the mobile unit; and
   when N consecutive frame erasures (FERs) have been detected, clamping a power of transmission on the link to a particular level; and
   determining whether the consecutive frame erasure counter is equal to an allowable consecutive frame erasure (N), wherein if the consecutive frame erasure counter equals the allowable consecutive frame erasure (N), then there is further included steps of:
   resetting a consecutive good frames counter;
   setting a gain ratio to a clamped gain ratio; and
   ignoring by the base station power control bits transmitted by the mobile unit.

2. In a mobile communication system, the power reduction method as claimed in claim 1, wherein there is further included a step of when M consecutive good frames have been detected, unclamping the power of the transmission on the link.

3. In a mobile communication system, the power reduction method as claimed in claim 2, wherein there is further included a step of determining whether the base station is in the soft handoff condition with the mobile unit.

4. In a mobile communication system, the power reduction method as claimed in claim 3, wherein if the base station is in the soft handoff condition there is further included the step of determining whether a gain ratio of a data frame corresponds to a previous data frame.

5. In a mobile communication system, the power reduction method as claimed in claim 4, wherein if the gain ratio of the data frame corresponds to the previous data frame there is further included a step of determining whether a good data frame was received.

6. In a mobile communication system, the power reduction method as claimed in claim 5, wherein if a good frame was detected there is further included a step of counting by the base station a number of consecutive frames received.

7. In a mobile communication system, the power reduction method as claimed in claim 6, wherein there is further included a step of determining whether a number of the consecutive good frames counter is equal to an allowable consecutive good frames (M).

8. In a mobile communication system, the power reduction method as claimed in claim 7, wherein if the number of consecutive good frames does equal M there is further included the steps of:

resetting the consecutive frame erasures counter; setting the gain ratio to an unclamped gain ratio; and responding by the base station to power control bits from the mobile unit.

* * * * *